(12) United States Patent
Bookless et al.

(10) Patent No.: US 11,380,207 B2
(45) Date of Patent: Jul. 5, 2022

(54) POSITIONING A SET OF VEHICLES

(71) Applicant: BAE SYSTEMS plc, London (GB)

(72) Inventors: John Paterson Bookless, Bristol South Gloucestershire (GB); Markus Deittert, Bristol South Gloucestershire (GB)

(73) Assignee: BAE SYSTEMS plc, London (GB)

( * ) Notice: Subject to any disclaimer, the term of this patent is extended or adjusted under 35 U.S.C. 154(b) by 411 days.

(21) Appl. No.: 16/629,161

(22) PCT Filed: Jun. 26, 2018

(86) PCT No.: PCT/GB2018/051774
§ 371 (c)(1),
(2) Date: Jan. 7, 2020

(87) PCT Pub. No.: WO2019/008326
PCT Pub. Date: Jan. 10, 2019

(65) Prior Publication Data
US 2020/0294404 A1    Sep. 17, 2020

(30) Foreign Application Priority Data

Jul. 7, 2017 (EP) .................................... 17275099
Jul. 7, 2017 (GB) .................................... 1710922

(51) Int. Cl.
*G08G 3/00* (2006.01)
*G01C 21/20* (2006.01)
(Continued)

(52) U.S. Cl.
CPC ............. *G08G 3/00* (2013.01); *G01C 21/203* (2013.01); *G01S 13/72* (2013.01); *G01S 13/86* (2013.01); *G01S 13/88* (2013.01)

(58) Field of Classification Search
CPC .......... G08G 3/00; G08G 3/02; G08G 5/0008; G08G 5/0013; G08G 5/0021;
(Continued)

(56) References Cited

U.S. PATENT DOCUMENTS 3,068,473 A * 12/1962 Muth ................... G08G 5/0082
342/463
4,926,171 A * 5/1990 Kelley .................. G01S 13/933
340/961

(Continued)

FOREIGN PATENT DOCUMENTS

EP    2081163 A1    7/2009
EP    2355451 A1    8/2011
(Continued)

OTHER PUBLICATIONS

International Search Report and Written Opinion received for PCT Application No. PCT/GB2018/051774, dated Sep. 14, 2018. 12 pages.

(Continued)

*Primary Examiner* — Richard M Camby
(74) *Attorney, Agent, or Firm* — Finch & Maloney PLLC

(57) ABSTRACT

A system and method of positioning a set of vehicles (102) with respect to an object (104) and a set of targets (106). Embodiments can generate (302) an isovist using data obtained from at least one sensor associated with the object and use it to compute (304) an estimated position of each target with respect to the object. Embodiments can compute (306) a plurality of positions for each vehicle based on the estimated positions of the targets, with each position having an associated value representing a number of the targets at their estimated positions that are within a predetermined proximity of the vehicle at that position. Embodiments can select (308) a subset of the positions based on the associated (Continued)

values, and position (310) the set of vehicles based on the selected subset of the positions.

20 Claims, 4 Drawing Sheets

(51) Int. Cl.
  *G01S 13/72*  (2006.01)
  *G01S 13/86*  (2006.01)
  *G01S 13/88*  (2006.01)

(58) Field of Classification Search
  CPC .. G08G 5/0026; G08G 5/0052; G08G 5/0078; G08G 5/0082; G01C 21/203; G01S 13/72; G01S 13/86; G01S 13/88
  See application file for complete search history.

(56) References Cited

U.S. PATENT DOCUMENTS

| | | | | |
|---|---|---|---|---|
| 5,374,932 | A | * | 12/1994 | Wyschogrod ........... G01S 13/91 342/39 |
| 5,714,948 | A | * | 2/1998 | Farmakis .............. G01S 5/0009 340/961 |
| 2003/0028294 | A1 | * | 2/2003 | Yanagi .................... G01S 13/86 340/984 |
| 2011/0029234 | A1 | * | 2/2011 | Desai ..................... G01C 21/20 701/467 |
| 2011/0066360 | A1 | * | 3/2011 | Haissig ................ G08G 5/0008 701/116 |
| 2012/0271538 | A1 | * | 10/2012 | Lee .......................... G08G 9/02 701/117 |
| 2014/0067249 | A1 | | 3/2014 | Gagliardi et al. |
| 2014/0129126 | A1 | * | 5/2014 | Richardson ............. G05D 1/00 701/300 |
| 2016/0025850 | A1 | | 1/2016 | Rigsby et al. |

FOREIGN PATENT DOCUMENTS

| | | |
|---|---|---|
| WO | 2008015467 A1 | 2/2008 |
| WO | 2019008326 A1 | 1/2019 |

OTHER PUBLICATIONS

GB Search Report under Section 17(5) received for GB Application No. 1710922.4 dated Nov. 15, 2017. 3 pages.
Extended European Search Report received for EP Application No. 17275099.4, dated Jan. 31, 2018. 5 pages.

* cited by examiner

POSITIONING A SET OF VEHICLES

The present invention relates to positioning a set of vehicles.

It can be desirable to position vehicles in an at least partly autonomous manner. For instance, an aim may be to determine the positions of one or more escort vehicle around a convoy in a manner that will best protect it from hostile entities, such as pirate boats who want to capture ships from the convoy. The visibility of the convoy and the escort vehicle(s) may be limited by obstacles in the environment, such as shore lines, islands and third party vessels. The pirates can be crafty and use such obstacles as cover in order to get close to the convoy without being detected before starting their final run, thus reducing the reaction time available to the escort vehicles.

Known research in the field of Operations Analysis (e.g. Wagner, Mylander and Sanders, "Naval Operations Analysis", Naval Institute Press, 2002) can determine the placement of destroyer screens or other escorting vessels. However, this analysis is undertaken before the start of a mission and its results are encoded as tactics and standing orders for later use. This approach can be sufficient for use on the open sea, but it cannot take into account visibility restrictions that occur when sailing through restricted waters close to land, for example.

Embodiments of the present invention are intended to address at least some of the above technical problems.

Embodiments can automatically compute positions for one or more vehicles, such as vehicles escorting a protected object, so that the probability of the escort vehicle(s) intercepting one or more pirate vehicles aiming for the protected object is substantially maximised.

According to one aspect of the present invention there is provided a (computer-implemented) method of positioning a set of vehicles with respect to an object and a set of targets, the method comprising:
generating an isovist using data obtained from at least one sensor associated with the object;
using the isovist to compute an estimated position in an environment of each target of the set of targets with respect to the object;
computing a plurality of positions in the environment for each vehicle of the set of vehicles based on the estimated positions of the targets, each position of the plurality of positions having an associated value representing a number of the targets at their estimated positions that are within a predetermined proximity of the vehicle at that position;
selecting a subset of the positions from the plurality of positions based on the associated values, and
positioning the set of vehicles based on the selected subset of the positions.

In some embodiments, the set of vehicles may comprise escort vehicles. The object may comprise at least one vehicle to be protected/screened by the escort vehicles. The set of targets may comprise a set of hostile vehicles aiming to attack the at least one vehicle protected/screened by the set of escort vehicles.

The predetermined proximity may represent a distance at which one of the escort vehicles can intercept at least one of the hostile vehicles.

The step of computing the estimated positions of the targets may comprise positioning a number of the targets at positions where detectability by the at least one sensor device is limited. The number may comprise a proportion (e.g. at least 10%) of the set of targets.

When the at least one sensor comprises an electro-optical sensor, the step of computing estimated positions of the targets may comprise:
positioning the number of the targets at positions corresponding to an outer edge of the isovist.

The number of the targets may be positioned at a said outer edge of the isovist that is nearest to the object.

When the at least one sensor comprises a radar, the step of computing estimated positions of the targets may comprise:
positioning the number of the targets at positions in the environment having a low detectability by the radar.

The step of computing the plurality of positions of the vehicles in the environment based on the computed position of the targets may comprise:
computing a Region of Approach for each of the targets, and
computing at least one position of the plurality of positions of the vehicles that is within the Region of Approach.

The Region of Approach may be computed using any suitable approach, including the method described in the "Search and Screening" paper by Koopman referenced below. For example, the step of computing the plurality of positions of the vehicles may comprise determining a plurality of starting positions for the vehicle, each starting position being within a notional circle having a radius calculated based on a velocity of the target, a velocity of the vehicle and a period of time until potential interception of the target by the vehicle.

The step of selecting a subset of the positions may comprise:
selecting the positions resulting in a highest probability of a greatest number of the targets at their estimated positions being within the predetermined proximity of at least some of the vehicles.

The step of selecting a subset of the positions may comprise:
selecting the positions resulting in a greatest number of the targets being within the predetermined proximity of at least some of the vehicles.

The step of selecting a subset of the positions may comprise:
for each of the positions of the plurality of positions, computing a ratio of the number of the targets within the predetermined proximity to a total number of the targets, and
selecting the positions based on the computed ratios.

The step of selecting the subset of the positions may comprise applying an optimisation technique to the computed ratios. The optimisation technique may comprise a heuristic, annealing or particle swarm optimisation technique.

According to another aspect there is provided a computer program product comprising instructions which, when the program is executed by a computer, cause the computer to carry out a method substantially as described herein.

According to a further aspect of the present invention there is provided a system adapted to position a set of vehicles with respect to an object and a set of targets, the system comprising at least one processor configured to:
generate an isovist using data obtained from at least one sensor associated with the object;
use the isovist to compute an estimated position in an environment of each target of the set of targets with respect to the object;
compute a plurality of positions in the environment for each vehicle of the set of vehicles based on the estimated positions of the targets, each position of the plurality of positions having an associated value representing a number of the targets at their estimated positions that are within a predetermined proximity of the vehicle at that position;

select a subset of the positions from the plurality of positions based on the associated values, and position the set of vehicles based on the selected subset of the positions.

The system may comprise a management system configured to output signals representing the selected positions.

Other aspects of the invention may provide a vehicle, or vehicle control system, configured to receive and execute signals representing positions output by a method/system substantially as described herein.

According to a further aspect there is provided a vehicle (e.g. an at least partly autonomous vehicle, or a manned vehicle) that includes a component, such as a computing device or control system, configured to execute a method substantially as described herein.

BRIEF DESCRIPTION OF THE FIGURES

For a better understanding of the invention, and to show how embodiments of the same may be carried into effect, reference will now be made, by way of example, to the accompanying diagrammatic drawings in which.

DETAILED DESCRIPTION OF THE FIGURES

Figure 1:
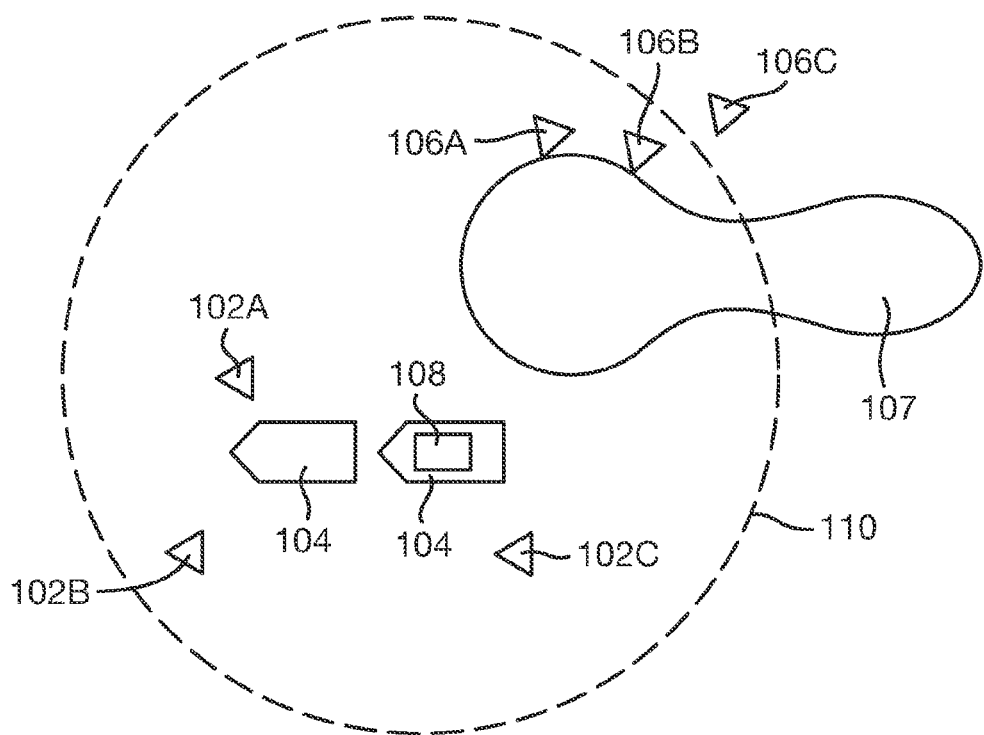
FIG. 1 schematically illustrates a set of escort vehicles that can protect a convoy from pirate vehicles.

FIG. 1 schematically illustrates a set of vehicles 102A, 102B, 102C. In the example these vehicles comprise escort vehicles in the form of Unmanned Surface Vehicles (USVs), although it should be understood that the number (one or more) and type of vehicles can vary. Each of the escort vehicles 102 may be at least partly autonomous. That is, the positioning of the vehicle may be directly automatically controlled by computer-generated signals, rather than by a human operator. The extent of the autonomous control can vary. For example, the direction and/or speed of the vehicle may be controlled by computer-generated signals, whilst other features or sub-systems of the vehicle may be under (local or remote) human control. Also, it may be possible to switch the vehicle between fully-autonomous, partly-autonomous and/or manual control methods.

FIG. 1 also illustrates an object 104 that is to be screened/ protected by the escort vehicles 102. In the example the object comprises a convoy that includes a set of ships, which may be of different types, although it should be understood that this is exemplary only. The convoy may be travelling at a relatively slow speed compared to the other vehicles/ objects, or it may be static at times.

FIG. 1 further illustrates a set of moving targets 106A, 106B, 106C that are being controlled to move generally towards the convoy 104 in order take some action in relation to it, e.g. an attack. For the sake of example only, the targets 106 will be referred to below as "pirate vehicles" and are to be targeted by the escort vehicles in order to prevent, or at least limit, an attack on the convoy. The pirate vehicles may be under (local or remote) human control, and/or may be at least partly autonomous. The pirate vehicles may be of different types to each other and, again, it should be understood that the number (one or more) and type of targets are merely exemplary.

In the example of FIG. 1, the vehicles 102, 104, 106 comprise water-borne vehicles, such as USVs, ships, boats or submarines. However, it will be appreciated that in other embodiments, the types of the vehicles may vary, and they may include various kinds of land-based (e.g. all-terrain vehicles, etc) and/or airborne vehicles (e.g. airplanes, helicopters, drones, etc).

In the example of FIG. 1, some of the pirate vehicles 106A, 1066 are located behind a land mass 107 and so are not in the line of sight of a sensor device 108 located on the convoy 104. In the example the sensor device has a range denoted by circle 110 and one of the pirate vehicles 106C is also located outside of the range. In this kind of situation, the pirate vehicles may not be detectable until they are relatively close to the convoy, thereby giving the escort vehicles less time to try to intercept them and increasing the risk of a damaging attack.

Embodiments can therefore be intended to compute positions for the escort vehicles in the environment surrounding the convoy where they are most likely to be able to intercept pirate vehicles in time should they appear, e.g. from behind a landmass or other obstacle. Embodiments can implement this by estimating positions of "virtual" pirates at locations where there is most risk of a real pirate vehicle lurking undetected. The escort vehicles can then be positioned so that they are ready to intercept these virtual pirates. Therefore, if a real pirate vehicle does appear at/near the position of a virtual pirate then it can be quickly intercepted by at least one of the escort vehicles.

Figure 2:
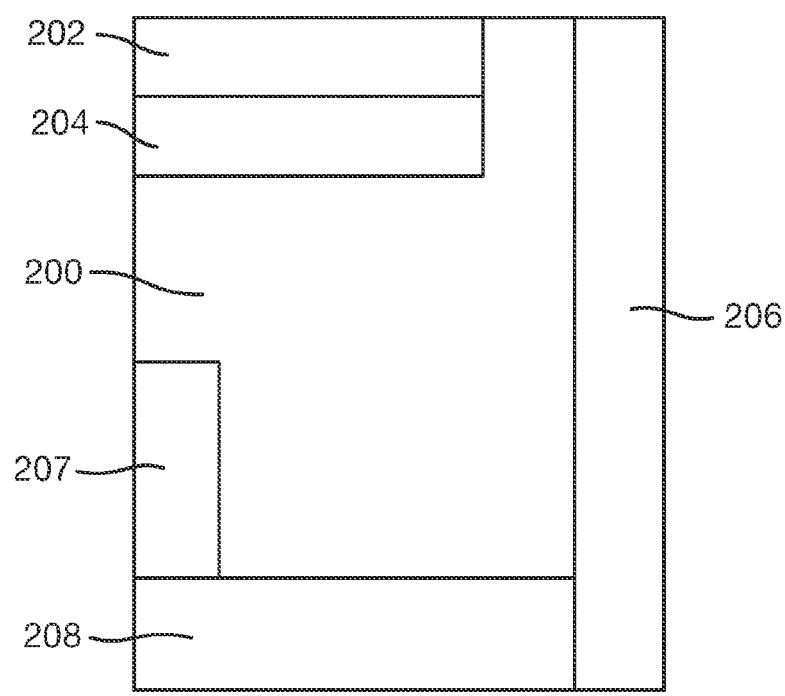
FIG. 2 is a block diagram of a computing device.

FIG. 2 is a block diagram of a computing device 200. This type of computing device may be installed on board at least one of the escort vehicles 102 and/or at least one of the convoy vehicles 104. Alternatively, the computing device may be located remotely (e.g. at a land base) and can be in communication with one or more devices on board one or more of the vehicles 102, 104. For example, the computing device 200 may be at a location remote from the vehicles and communicate with a device on board one of the convoy vehicles 104. That device may then send control signals to devices/systems on board the escort vehicles 102 in order to autonomously position them. In some embodiments, the computing device 200 may be part of a combat management system that can command and control unmanned off-board systems. The system may be in communication with a mission planning tool that formulates mission plans for off-board systems by decomposing the mission objectives, as stated by an operator, into tasks that are assigned to the available assets and the execution times of which are scheduled. The decomposition step can encode tactics and standing orders and is thus well placed to compute optimal escort positions for a given convoying mission objective.

The computing device 200 typically includes a processor 202 and a memory 204. The computing device can further include at least one communications interface 206 that allows it to transfer data to/from other devices, such as other computing devices installed on broad one or more of the (other) escort vehicles 102 and/or on one or more of the (other) convoy vehicles 104. The communications interface will typically provide wireless communication over a communications network and may transfer data in an encrypted manner. The computing device may comprise further conventional components, such as a display, user interface, external storage, etc, that need not be described here in detail. In some cases the components and/or functions of the computing device may be distributed.

In some cases, particularly where the computing device 200 is located on board one of the escort vehicles 102, it may further include (or be in communication with) a vehicle controller 207. The vehicle controller can comprise circuitry or the like that can directly control one or more positioning components/sub-system of the escort vehicle, including ones that can control the direction and speed of the vehicle, thereby allowing it to function as an at least partly autonomous vehicle.

The computing device 200 may include at least one sensor device 208. Alternatively or additionally, the computing device may be in direct or indirect communication with at least one sensor device (e.g. over a communications network or wired/wireless connection). In the example the at least one sensor device can be associated with the convoy 104. In some cases, the sensor device(s) may be installed on one of the convoy vehicles. Alternatively or additionally, the sensor device(s) may be located on another moveable object/vehicle (e.g. an autonomous vehicle, such as one of the escort vehicles 102) that maintains close proximity to the convoy, e.g. by following it. The sensor device(s) may be controllable, e.g. it may be under remote control from the computing device 200, or from one or more other device(s) and/or operator(s). The sensor device(s) may comprise an electro-optical sensor, a radar-based sensor and/or any other suitable device. In the case of an electro-optical sensor, the device may comprise a still/video camera, an infra-red imaging device, an ultra-violet imaging device, etc.

Figure 3:
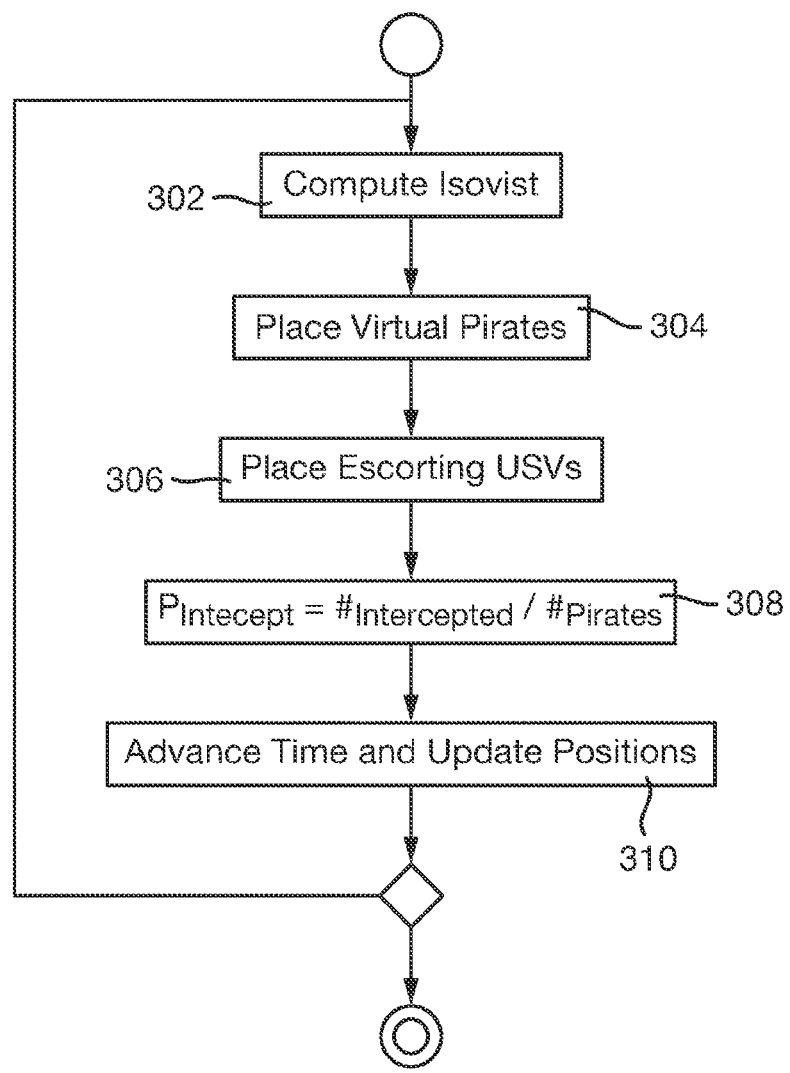
FIG. 3 is a flowchart illustrating operations performed by the computing device according to an example embodiment.

FIG. 3 is a flowchart illustrating steps that can be performed by an example embodiment, e.g. by code executing on the computing device 200. It will be appreciated that the illustrated steps are exemplary only and in alternative embodiments some of them may be omitted, re-ordered and/or performed concurrently rather than sequentially. Further, additional steps (not illustrated) may be performed. The skilled person will understand that the steps can be implemented by hardware and/or software, using any suitable programming languages/techniques and data structures, where appropriate. The method may be started and/or terminated by a user, or automatically when certain conditions are met, e.g. based on external control signals being received.

At step 302 embodiments can generate an isovist that describes the visible space around the convoy 104. An isovist comprises a volume of space visible from a certain point and time, with respect to its environment. The embodiment may generate the isovist from a computation of the line of sight using data obtained from the at least one sensor device 208 that is associated with the convoy 104. The isovist may be generated using any suitable technique, e.g. raytracing or visibility computations, based on data provided by an electro-optical sensor. In some embodiments, an angle variable can initially be set to zero, with the method finding the closest intersection in the line of maximum sensor range from the origin in the direction of this angle. The angle is incremented until a circle is complete to generate the isovist. Alternatively or additionally, the isovist can include an area in which an object is detectable when illuminated with one or more radar-based sensor device 208 from a given point. In this case, the isovist does not have a clear crisp edge, but is described by a probability field where the probability of detection diminished towards the edges.

Figure 4:
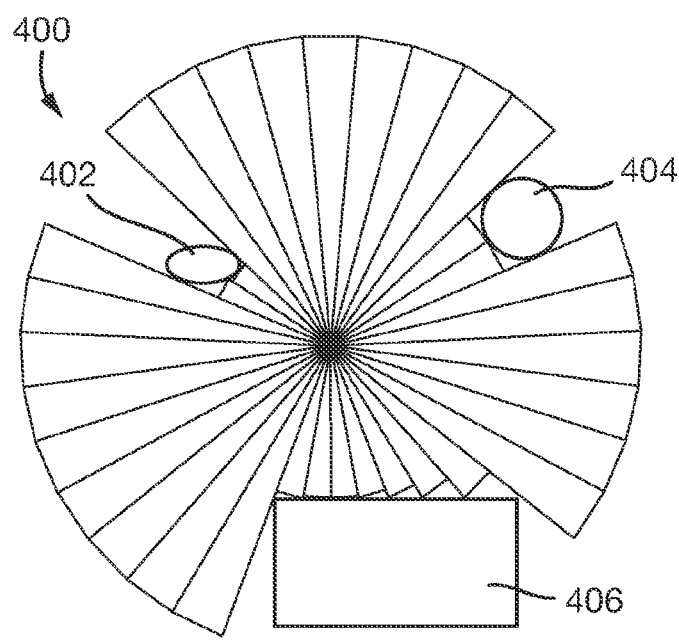
FIG. 4 schematically illustrates an example isovist generated using data provided by an electro-optical sensor.

FIG. 4 illustrates an example of an isovist 400 generated based on data provided by an electro-optical sensor. The example isovist is approximated using a union of triangles as an internal representation, but it should be understood that this is exemplary only. In some places the line of sight of the sensor did not extend to the outer edge of the isovist. Items 402, 404 and 406 in the Figure represent generalised obstacles that block the line of sight.

Figure 5:
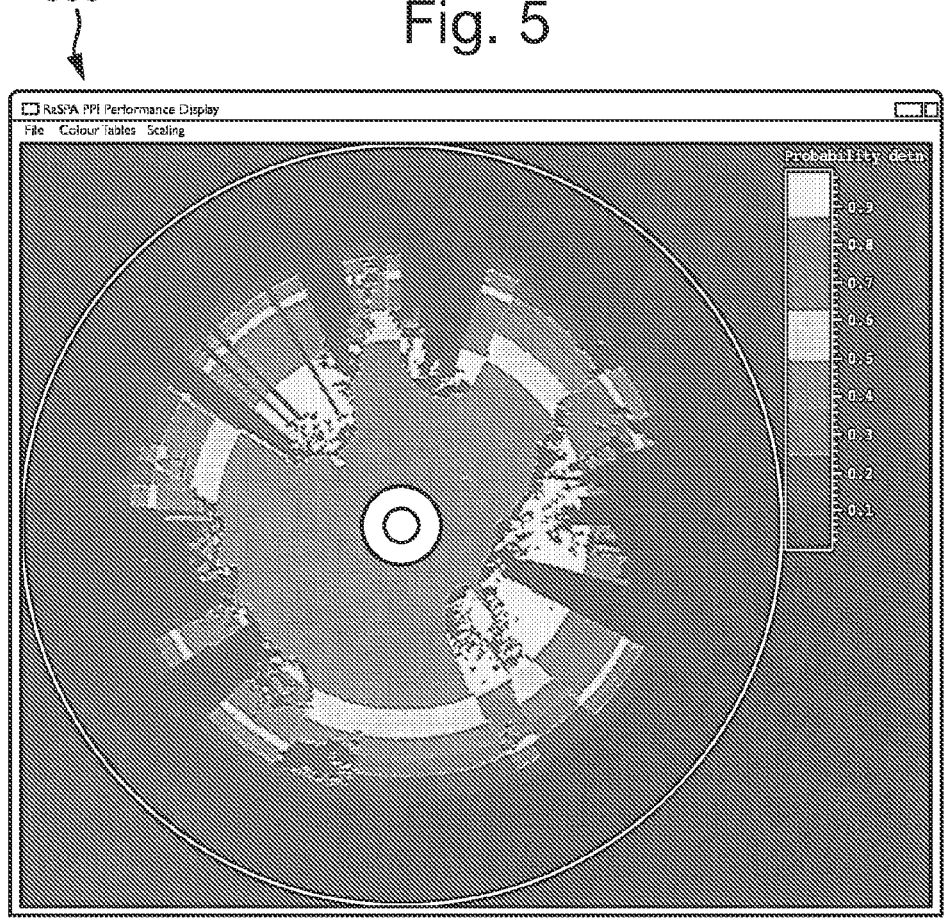
FIG. 5 schematically illustrates an example isovist generated using data provided by a radar-based sensor, and FIGS. 6A-6C schematically illustrate a Region of Approach computation.

FIG. 5 illustrates an example of an isovist 500 generated based on data provided by a radar. In the example, positions in the isovist are colour/shaded based on the probability of detectability by the radar, with lighter colours/shades representing a higher probability and darker (non-black) representing lower probability.

The isovist is a function of the sensor device(s) 208 being used, the disposition of the convoy 104 associated with the sensor device(s), all/some of the escort vehicles 102 and/or the pirate vehicles 106 and any landmass or other obstacles. Embodiments can therefore process additional information in order to generate the isovist at the step 302. For example, embodiments may receive data relating to positions/routes of the vehicles 102, 104 and/or 106. For a given time step in a mission, embodiments can determine/predict the positions of the convoy, the escort vehicles and other traffic. This predicted position data, together with geographical data (terrain elevation, etc), form the data that is input to the isovist computation. Embodiments may also receive and process data relating to the at least one sensor device 208, e.g. information regarding sensor type, position, etc.

At step 304 embodiments can compute an estimated position of each of the pirate vehicles 106 in the generated isovist. Embodiments may generate (or receive input representing) an initial number (e.g. 1000) of virtual pirates. Embodiments may position at least some (and typically, for example, between 100 and 1000, i.e. at least 10%) of the pirate vehicles 106 where detectability from the sensor device(s) 208 associated with the convoy 104 is limited. For instance, the pirate vehicles 106 could attack the convoy 104 from the edge of its visibility, especially where that edge is very close to the convoy (e.g. 1 to 2 nautical miles, where the pirate has a speed of 30 knots, which would leave the escort vehicle just 4 minutes to react) such that the pirates could be concealed by other vessels and/or obstacles, such as a landmass.

In cases where data from an optical line of sight sensor device(s) is used, a fixed number (e.g. 100 to 1000, i.e. at least 10%) of the virtual pirates 106 may be placed in a 2D or 3D representation of the environment surrounding the convoy 104 that is generated using the isovist. In some embodiments a coordinate system can be used for this representation of the environment, with the origin of the coordinate system being located at the centre of the convoy (e.g. where a sensor is positioned) and moving with the convoy. The coordinate system can be oriented such that its y-axis is oriented to be parallel with the track of the convoy, i.e. course over a surface. In such a coordinate system, the isovist can be expressed (e.g. by transforming its features to coordinates), and the virtual pirates 106 and the escorts 104 can also be positioned in it. The positions of the virtual pirates 106 in the environment may be generated by randomly sampling an edge of the isovist. During this sampling process, the likelihood that a virtual pirate is placed in location 'x' is a function of the inverse distance to the convoy 104, i.e. a large number of virtual pirates is placed on those isovist edges that are close to the convoy.

With a radar-based sensor device 208, the generated isovist is not black and white, but, rather, a field of detection probability values. Hence, different sampling strategies can be used for electro-magnetic and radar-based sensor devices. In cases where data from a radar-based sensor device(s) is used, a fixed number (e.g. 100 to 1000, i.e. at least 10%) of the virtual pirates may be placed in the representation of the environment surrounding the convoy 104 by randomly sampling the entire area of the isovist. During this sampling process, the likelihood that a virtual pirate is placed in location 'x' is a function of the inverse of the probability of detection by the radar sensor device(s), i.e. more virtual pirates are placed in locations of low detectability compared with regions of high detectability.

At step 306 embodiments can compute positions of the escort vehicles 102 in the representation of the environment surrounding the convoy 104 based on the estimated positions of the pirate vehicles 106. Multiple sets of possible positions for all/some of the escort vehicles can be computed. Embodiments can use these with the aim of positioning the escort vehicles in the environment such that the likelihood of them coming into predetermined proximity with at least one real/actual pirate vehicle 106 (that has not already been detected) is increased/maximized, e.g. in order to successfully intercept an attack against the convoy 104 by a real pirate. Thus, an aim can be to place the escort vehicles such that the largest possible number of pirate vehicles is interceptable. Embodiments will normally assume that the escort vehicles must be able to intercept the fast boats of the pirates. The predetermined proximity may be a fixed value (e.g. expressed as a straight-line distance or radius from the position of a pirate vehicle), or it may be updatable by an operator and/or automatically (e.g. depending on real-time factors, such as velocity of an escort and/or pirate vehicle; proximity of pirate vehicle to other vehicles/objects; type of action (such as collide, fire weapon from a distance, jam communications from a distance, etc) to be taken, and so on).

In some embodiments the "Region of Approach" concept as described, for example, in Bernhard Osgood Koopman, "Search and Screening", Volume 56 of United States Office of Naval Operations. Operations Evaluation Group: OEG-report, Operations Evaluation Group, 1946, can be used to determine the area from which each pirate vehicle 106 can be intercepted by a given escort vehicle 102 placed at a given location. A summary of this Region of Approach computation is schematically illustrated in FIGS. 6A-6C.

Figure 6A:
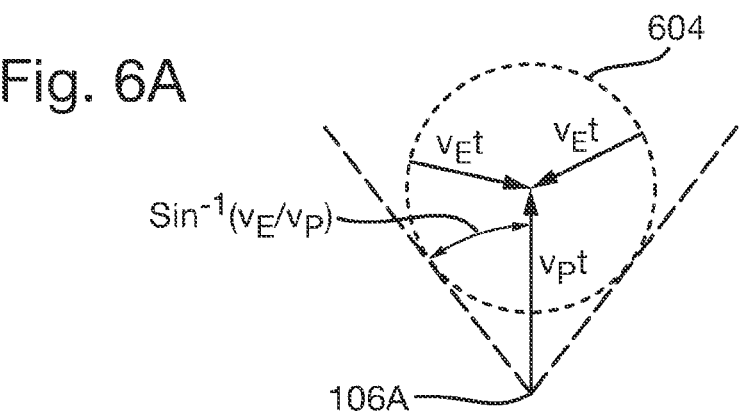

Referring to FIG. 6A, it is assumed that one of the pirates 106A is moving with a velocity of $v_P$ and that the escort vehicle is moving with a velocity of $v_E$. It is also assumed that interception of the pirate by the escort vehicle is achieved after t seconds. During that time, the pirate travels a distance of $v_P t$, while the escort vehicle travels $v_E t$. If the pirate's track is drawn as an arrow of length $v_P t$ from the pirate's initial location in direction of his travel, then the escort vehicle must start its interception from an arrow of radius $v_E t$ located as shown in the Figure. If the escort vehicle starts its interception within the dashed circle 604 then interception can be achieved in less than t seconds.

Figure 6B:
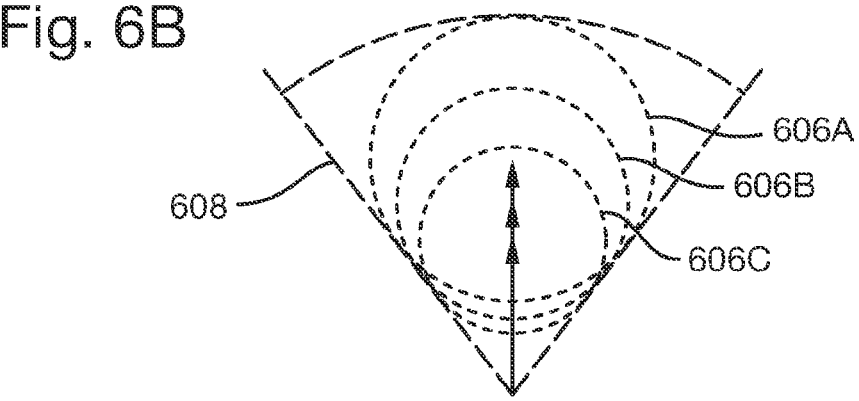

Referring to FIG. 6B, if the type of analysis illustrated in FIG. 6A is repeated for different values of t, a family of circles is obtained, e.g. three circles 606A-606C for three different values of t. Two cases can be distinguished: a) $v_E \geq v_P$, and b) $v_E < v_P$. In the former case, the largest circle 606A, i.e. of size $v_E t_{max}$ encloses all relevant starting locations. In the latter case, all relevant starting locations are described by a family of circles 606A-606C and the area of interest is bounded by a circular sector 608 with an arc of $\sin^{-1}(v_E/v_P)$ degrees.

Figure 6C:
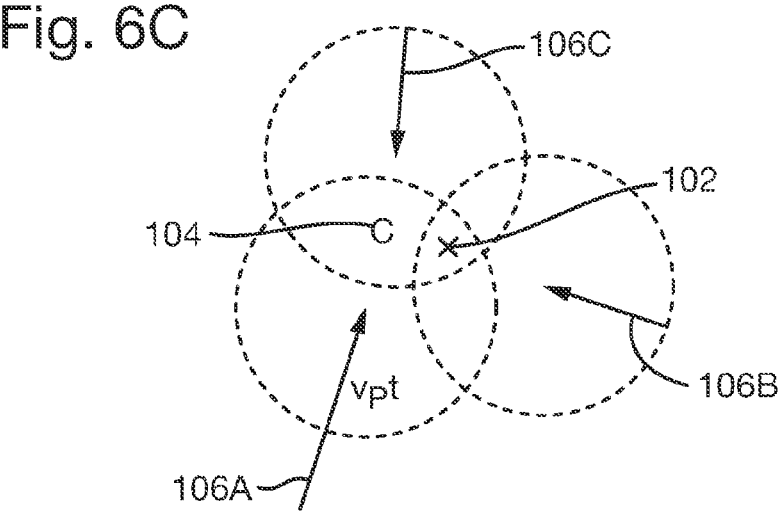

Referring to FIG. 6C, three virtual pirates 106A-106C are shown by their track arrows, the convoy 104 located at c and an escort vehicle 102 located at x. As x is located within all three of the circles, the escort vehicle is able to intercept any one of the three pirates and will be in a good position should a real pirate appear from a similar location and direction.

For each such computed position it is possible to determine how many of the virtual pirate vehicles 106 located at their estimated positions are within the predetermined proximity of the escort vehicle 102 located at that computed position. Thus, each of the computed positions can have an associated value representing a number (zero or more) of the pirate vehicles 106 that are within the predetermined proximity of the escort vehicle 102 that is at that computed position.

At step 308 embodiments can select a subset of the positions that were computed at the step 306 (e.g. based on their associated values representing the number of pirate vehicles 106 within the predetermined proximity of the escort vehicle), with the aim of selecting the positions where the largest number of pirates can be intercepted. For example, the likelihood, P, that an attack by a real pirate vehicle can be intercepted in time can be approximated by the ratio of the number of intercepted virtual pirates, $n_{intercepted}$, and the total number of virtual pirates, n:

$$P = \frac{n_{intercepted}}{n}$$

The subset of escort vehicle 102 positions can be computed using an optimisation approach (e.g. a heuristic approach, such as Simulated Annealing or Particle Swarm Optimisation) to select the combination of positions having the best ratios P; however, other approaches may be used.

At step 310 embodiments can use the subset of positions selected at the step 308 to position the escort vehicles 102 so that they generally correspond to the selected positions. This can involve sending signals to the vehicle controller 207 of one or more of the escort vehicles in order to directly control the positions of the vehicles. Additionally or alternatively, this can include displaying information to assist a (local or remote) operator with controlling the positions of one or more of the escort vehicles and/or for simulation purposes. Such operations may be done substantially in real-time as the method is executed, or position information may be stored for future use (e.g. to pre-emptively position at least some escort vehicles as soon as a warning regarding a possible attack is received). In some cases, embodiments of the method may be performed in order to plan before a mission, e.g. repeat its calculations for future nominal time steps. In other cases, embodiments of the method may be performed initially in order to plan while the mission is being executed, then after a period of time/waiting its calculations are repeated so that the positions for the escort vehicles are recomputed based on up-to-date information obtained from the at least one sensor device.

The relative positions of the convoy 104 and the vehicles 102, 106 with respect to other boats and obstacles, such as rocks, islands and headlands, etc, typically change over time. Embodiments can use time discretised into equally sized slots for repeating the analysis for each time slot (with control returning to the step 302 from the step 310). In order to save on computational effort, the solution of the previous time step may be used as an initial guess for the current time step.

Thus, embodiments can compute optimum screening locations for escort vehicles such that visibility restrictions due to other vessels or land is taken into account. Embodiments can compute vehicle positions shortly before a mission is started or during an ongoing mission.

It will be understood that embodiments may be provided for situations other than vehicles escorting a convoy to protect it from pirate vehicles, such as meeting vehicles carrying supplies to pick up the supplies and transfer them to another vehicle or location, etc.

Attention is directed to any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computer-implemented method of positioning a set of vehicles with respect to an object and a set of targets, the method comprising:
   generating an isovist using data obtained from at least one sensor associated with the object;
   using the isovist to compute an estimated position in an environment of each target of the set of targets with respect to the object;
   computing a plurality of positions in the environment for each vehicle of the set of vehicles based on the estimated positions of the targets, each position of the plurality of positions having an associated value representing a number of the targets at their estimated positions that are within a predetermined proximity of the vehicle at that position;
   selecting a subset of the positions from the plurality of positions based on the associated values; and
   positioning the set of vehicles based on the selected subset of the positions.

2. The method according to claim 1, wherein computing the estimated positions of the targets comprises positioning a number of the set of targets at positions of the isovist where detectability by the at least one sensor device is limited.

3. The method according to claim 2, wherein the number comprises at least 10% of the set of targets.

4. The method according to claim 2, wherein the at least one sensor comprises an electro-optical sensor, and computing estimated positions of the targets comprises:
   positioning the number of the targets at positions corresponding to an outer edge of the isovist.

5. The method according to claim 4, wherein the number of the targets are positioned at a said outer edge of the isovist that is nearest to the object.

6. The method according to claim 2, wherein the at least one sensor comprises a radar, and computing estimated positions of the targets comprises:
   positioning the number of the targets at positions in the isovist having a low detectability by the radar.

7. The method according to claim 1, wherein computing the plurality of positions comprises:
   computing a Region of Approach for each of the estimated positions of the targets; and
   computing the positions of each of the vehicles within the computed Regions of Approach.

8. The method according to claim 7, comprising determining a plurality of starting positions for each of the vehicles, each said starting position being within a notional circle having a radius calculated based on a velocity of the target, a velocity of the vehicle, and a period of time until potential interception of the target by the vehicle.

9. The method according to claim 1, wherein selecting the subset of the positions comprises:
   selecting the positions resulting in a greatest number of the targets being within the predetermined proximity of at least some of the vehicles.

10. The method according to claim 9, wherein selecting the subset of the positions comprises:
    for each of the positions of the plurality of positions, computing a ratio of the number of the targets within the predetermined proximity to a total number of the targets; and
    selecting the positions based on the computed ratios.

11. The method according to claim 10, wherein selecting the subset of the positions comprises applying an optimisation technique to the computed ratios.

12. The method according to claim 1, wherein the set of vehicles comprises a set of escort vehicles, the object comprises at least one vehicle to be protected and/or screened by the set of escort vehicles, and the set of targets comprises a set of hostile vehicles aiming to attack the at least one vehicle protected and/or screened by the set of escort vehicles.

13. The method according to claim 12, wherein the predetermined proximity represents a distance at which one of the escort vehicles can intercept at least one of the hostile vehicles.

14. A computer program product comprising one or more non-transitory machine-readable mediums encoded with instructions which, when executed by one or more processors, cause a process to be carried out for positioning a set of vehicles with respect to an object and a set of targets, the process comprising:
    generating an isovist using data obtained from at least one sensor associated with the object;
    using the isovist to compute an estimated position in an environment of each target of the set of targets with respect to the object;
    computing a plurality of positions in the environment for each vehicle of the set of vehicles based on the estimated positions of the targets, each position of the plurality of positions having an associated value representing a number of the targets at their estimated positions that are within a predetermined proximity of the vehicle at that position; and
    selecting a subset of the positions from the plurality of positions based on the associated values.

15. A system adapted to position a set of vehicles with respect to an object and a set of targets, the system comprising at least one processor configured to:
- generate an isovist using data obtained from at least one sensor associated with the object;
- use the isovist to compute an estimated position in an environment of each target of the set of targets with respect to the object;
- compute a plurality of positions in the environment for each vehicle of the set of vehicles based on the estimated positions of the targets, each position of the plurality of positions having an associated value representing a number of the targets at their estimated positions that are within a predetermined proximity of the vehicle at that position;
- select a subset of the positions from the plurality of positions based on the associated values; and
- position the set of vehicles based on the selected subset of the positions.

16. The computer program product according to claim 14, wherein computing the estimated positions of the targets comprises positioning a number of the set of targets at positions of the isovist where detectability by the at least one sensor device is limited.

17. The computer program product according to claim 14, wherein:
- the at least one sensor comprises an electro-optical sensor, and computing estimated positions of the targets comprises positioning the number of the targets at positions corresponding to an outer edge of the isovist; and/or
- the at least one sensor comprises a radar, and computing estimated positions of the targets comprises positioning the number of the targets at positions in the isovist having a low detectability by the radar.

18. The computer program product according to claim 14, wherein computing the plurality of positions comprises:
- computing a Region of Approach for each of the estimated positions of the targets; and
- computing the positions of each of the vehicles within the computed Regions of Approach.

19. The computer program product according to claim 14, wherein selecting the subset of the positions comprises:
- selecting the positions resulting in a greatest number of the targets being within the predetermined proximity of at least some of the vehicles; and/or
- for each of the positions of the plurality of positions, computing a ratio of the number of the targets within the predetermined proximity to a total number of the targets, and selecting the positions based on the computed ratios.

20. The computer program product according to claim 14, the process further comprising:
- causing transmission of position information to the set of vehicles, the position information based on the selected subset of the positions;
- wherein causing transmission of the position information includes
  - sending a signal to a vehicle controller of a vehicle of the set of vehicles to control the position of that vehicle in accordance with the corresponding position information; and/or
  - causing display of information to assist a local or remote operator of a vehicle of the set of vehicles with controlling the position of that vehicle in accordance with the corresponding position information.

\* \* \* \* \*